US008038325B2

(12) United States Patent
Yanagisawa et al.

(10) Patent No.: US 8,038,325 B2
(45) Date of Patent: Oct. 18, 2011

(54) METHOD FOR MANUFACTURE OF REFLECTING MIRROR, REFLECTING MIRROR, ILLUMINATION DEVICE, AND PROJECTOR

(75) Inventors: Hirotaka Yanagisawa, Misato-mura (JP); Kazuhiro Nishida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 12/334,963

(22) Filed: Dec. 15, 2008

(65) Prior Publication Data

US 2009/0097259 A1 Apr. 16, 2009

Related U.S. Application Data

(62) Division of application No. 11/067,656, filed on Feb. 28, 2005, now abandoned.

(30) Foreign Application Priority Data

Mar. 1, 2004 (JP) ................................. 2004-056548

(51) Int. Cl.
*F21V 7/00* (2006.01)

(52) U.S. Cl. ........ 362/297; 362/253; 362/255; 362/261; 362/296.01

(58) Field of Classification Search .................. 362/253, 362/255, 261–262, 296.01, 297
See application file for complete search history.

(56) References Cited

U.S. PATENT DOCUMENTS

| 3,702,395 | A | 11/1972 | Rosendahl |
| 5,143,445 | A | 9/1992 | Bateman et al. |
| 5,491,525 | A | 2/1996 | Yamazaki et al. |
| 6,546,752 | B2 | 4/2003 | Sulcs et al. |
| 6,557,379 | B1 | 5/2003 | Nagasawa et al. |
| 7,159,990 | B2 | 1/2007 | Hashizume |

FOREIGN PATENT DOCUMENTS

| EP | 1 450 100 A1 | 8/2004 |
| JP | A-05-062595 | 3/1993 |
| JP | A 05-74418 | 3/1993 |
| JP | A 6-289394 | 10/1994 |
| JP | A 08-031382 | 2/1996 |
| JP | A-09-120067 | 5/1997 |

OTHER PUBLICATIONS

Strong, J., "Evaporation Technique for Aluminum", Phys. Rev. 43 (1933), pp. 498-498.

*Primary Examiner* — Stephen F Husar
*Assistant Examiner* — Meghan Dunwiddie
(74) *Attorney, Agent, or Firm* — Oliff & Berridge, PLC

(57) ABSTRACT

An auxiliary reflecting mirror is manufactured by heating the central portion of a quartz glass tube and compressing the central portion by pushing two end portions of the quartz glass tube so that the wall thickness of the central portion thickens, accommodating the quartz glass tube after thickening the wall thickness of the central portion in a mold having inner surfaces formed to the reflecting surface shape, which is to be formed in an auxiliary reflecting mirror, and forming an expanded portion by expanding the central portion, of which the wall thickness was thickened, by introducing a gas from the two ends of the quartz glass tube, cutting the quartz glass tube in at least the central portion of the expanded portion, evaporating a reflecting film on the outer surface of the expanded portion and forming a reflecting surface.

3 Claims, 6 Drawing Sheets (a)

(b)

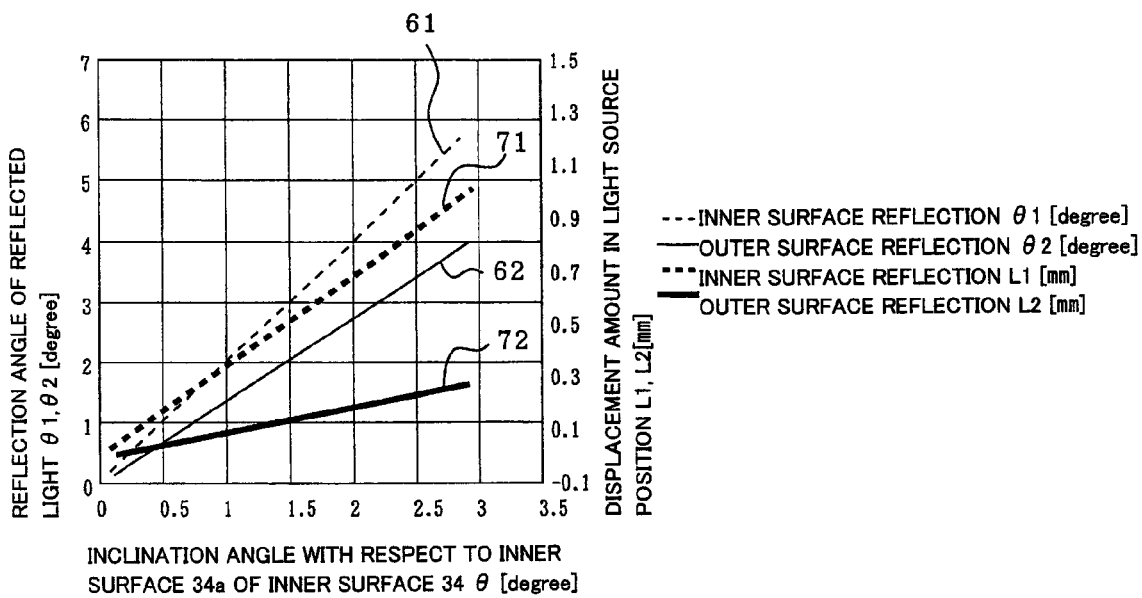
F I G. 5

METHOD FOR MANUFACTURE OF REFLECTING MIRROR, REFLECTING MIRROR, ILLUMINATION DEVICE, AND PROJECTOR

BACKGROUND

This is a Division of application Ser. No. 11/067,656 filed Feb. 28, 2005 and claims priority to Japanese Patent Application No. 2004/56548, filed Mar. 1, 2004. The disclosure of these prior applications is hereby incorporated by reference herein in its entireties.

Exemplary aspects of the present invention relate to a method for the manufacture of an auxiliary reflecting mirror for installation in an illumination device, an auxiliary reflecting mirror manufactured by such a manufacturing method, an illumination device equipped with such an auxiliary reflecting mirror, and a projector equipped with such an illumination device.

PRIOR ART

A related art illumination device is equipped with: a light-emitting tube and a main reflecting mirror to direct the light emitted from the light-emitting tube in a prescribed direction; and an auxiliary reflecting mirror composed of quartz or the like provided in a position facing the main reflecting mirror on the other side of the light-emitting tube. Thus, it was possible to utilize effectively the light that was emitted from the light-emitting tube. However, a stray light was not supplied for use. See JP-A-H8-31382 (second page, FIG. 1).

SUMMARY

In the illumination device of this type, because the auxiliary reflecting mirror was provided with the object of increasing the light effective efficiency, a high accuracy was required for the reflecting surface thereof.

Exemplary aspects of the present invention address this and/or other problems and provide: a method for the manufacture of a reflecting mirror, which makes it possible to form the reflecting surface with good accuracy and with a high light utilization efficiency; the reflecting mirror manufactured by such a method; an illumination device equipped with such a reflecting mirror, and a projector equipped with such an illumination device.

A method for the manufacture of a reflecting mirror in accordance with an exemplary aspect of the present invention is a method for the manufacture of a reflecting mirror of an illumination device including a light-emitting tube and the reflecting mirror to reflect a light from the light-emitting tube. This method includes heating the central portion of a quartz glass tube and compressing the central portion by pushing the two end portions of the quartz glass tube so that the wall thickness of the central portion thickens, accommodating the quartz glass tube after thickening the wall thickness of the central portion in a mold having an inner surface formed to the reflecting surface shape which is to be formed in a reflecting mirror, and forming an expanded portion by expanding the central portion, of which the wall thickness was thickened, by introducing a gas from the two ends of the quartz glass tube, cutting the quartz glass tube in at least the central portion of the expanded portion, and evaporating a reflecting film on the outer surface of the expanded portion and forming a reflecting surface.

With such a method, the reflecting surface can be formed with good accuracy and an auxiliary reflecting mirror with a high light utilization efficiency can be manufactured.

Further, in a method for the manufacture of a reflecting mirror in accordance with an exemplary aspect of the present invention, in the cutting, both end portions of the cylindrical portions extending outwardly from the two ends of the expanded portion are cut in addition to cutting in the vicinity of the central portion of the expanded portion of the quartz glass tube, and cylindrical mounting support portions provided to fix to the light-emitting tube are formed.

Because the mounting support portions are thus formed, an auxiliary reflecting mirror with good mounting ability on the light-emitting tube can be manufactured.

Further a reflecting mirror in accordance with an exemplary aspect of the present invention is manufactured by the above-described method for the manufacture of a reflecting mirror.

The reflecting mirror thus manufactured has a high light utilization efficiency and good mounting ability on the light-emitting tube.

Further, an illumination device in accordance with an exemplary aspect of the present invention includes a light-emitting tube and a reflecting mirror to reflect the light from the light-emitting tube toward an illumination region. The reflecting mirror is manufactured by the above-described method for the manufacture of a reflecting mirror.

Because the reflecting mirror manufactured by the above-described manufacturing method is provided, an illumination device with a high light utilization efficiency can be obtained.

Further, an illumination device in accordance with an exemplary aspect of the present invention includes a light-emitting tube, a main reflecting mirror to reflect the light from the light-emitting tube toward an illumination region, and an auxiliary reflecting mirror to reflect the light from the light-emitting tube toward the main reflecting mirror. The auxiliary reflecting mirror is manufactured by the above-described method for the manufacture of a reflecting mirror.

Because the auxiliary reflecting mirror manufactured by the above-described manufacturing method is provided, an illumination device with a high light utilization efficiency can be obtained.

Further, a projector in accordance with an exemplary aspect of the present invention includes the above-described illumination device, a light modulation device to modulate the luminous flux emitted from the illumination device according to an image information, and a projection optical system to project the luminous flux modulated by the light modulation device.

Because the above-described illumination device is provided, a projector with increased luminosity can be obtained.

BRIEF DESCRIPTION OF THE DRAWINGS

FIG. 5 is a schematic illustrating the comparison results obtained in the case inner surface reflection and outer surface reflection.

DETAILED DESCRIPTION OF EXEMPLARY EMBODIMENTS

First, prior to explaining a method for the manufacture of a reflecting mirror of an exemplary embodiment of the present invention, an illumination device including an auxiliary reflecting mirror manufactured by this manufacturing method will be explained.

Figure 1:
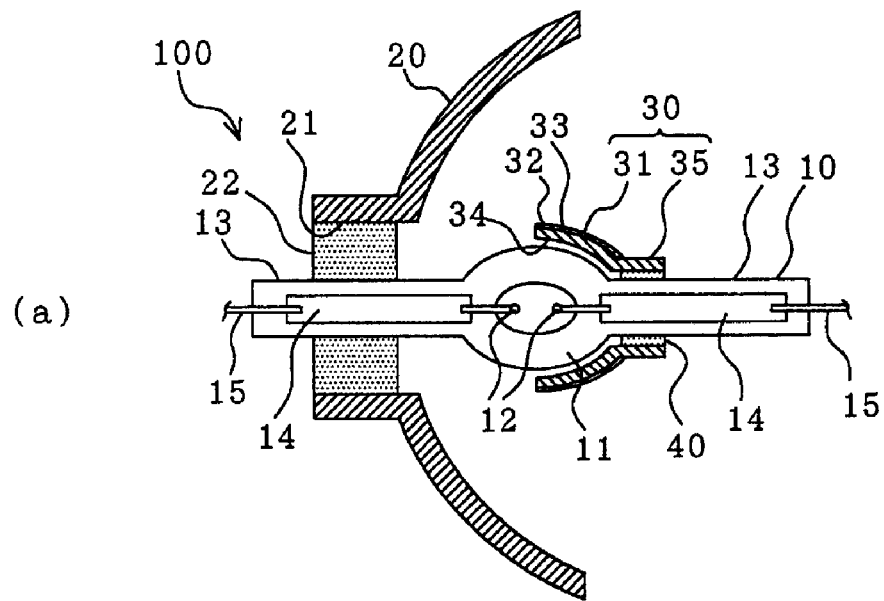
FIGS. 1(a) and (b) are schematics of an illumination device equipped with an auxiliary reflecting mirror of an exemplary embodiment of the present invention.
Figure 1:
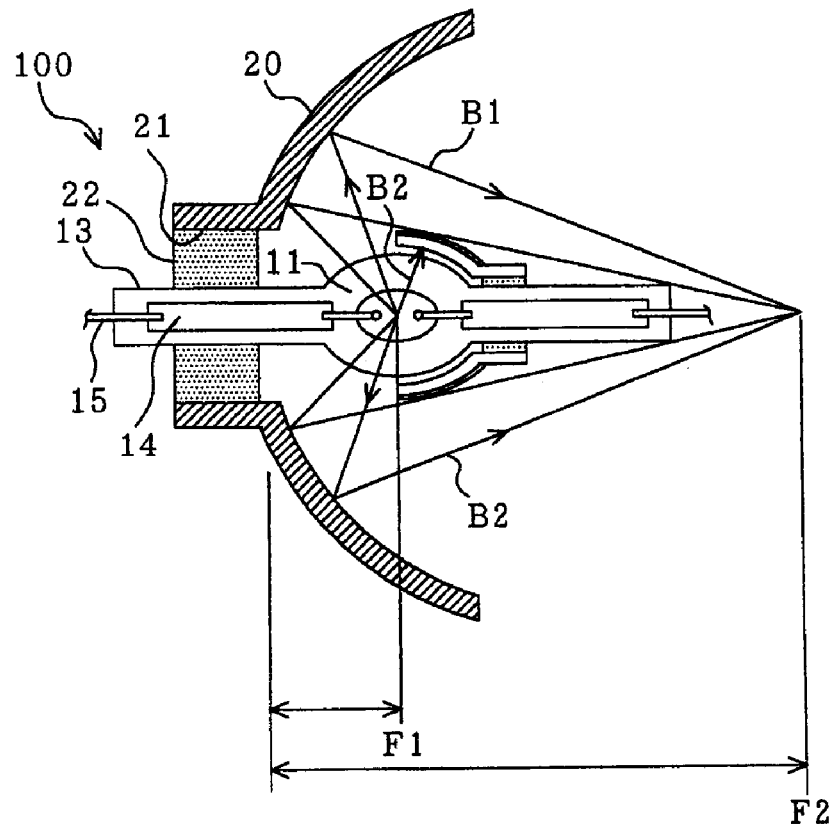

FIG. 1(*a*) is a schematic of an illumination device including an auxiliary reflecting mirror manufactured by the method for the manufacture of a reflecting mirror in accordance with an exemplary aspect of the present invention.

This illumination device 100 includes a light-emitting tube 10, a main reflecting mirror 20 to reflect the light from the light-emitting tube 10 toward the illumination region, and an auxiliary reflecting mirror 30 to reflect the light from the light-emitting tube 10 toward the main reflecting mirror 20. The light-emitting tube 10 is made from quartz glass or the like and is composed of a central light-emitting portion 11 having sealed inside thereof tungsten electrodes 12, 12, mercury, a rare gas, and a small amount of a halogen, and sealing portions 13, 13 on both sides of the light-emitting portion 11. A metal foil 14 composed of molybdenum and connected to the electrode 12 is sealed hermetically in each sealing portion 13. Each metal foil 14, 14 is provided with respective lead wire 15, 15 leading to the outside. The light-emitting tube 10 is not limited to a mercury lamp and may be a metal halide lamp or a xenon lamp.

The main reflecting mirror 20 is a reflecting element disposed behind the light-emitting portion 11 and includes a reflecting portion having a concave reflecting surface shaped as an ellipsoid of rotation and a through hole 21 to fix the light-emitting tube 10. The through hole 21 is located in the central portion of the reflecting portion. The light-emitting tube 10 is fixed with an inorganic adhesive 22, such as a cement, in the through hole 21 of the main reflecting mirror 20 so that the axis of the light-emitting tube 10 and the axis of the main reflecting mirror 20 coincide with each other and that the arc image generated between a pair of electrodes 12 and the first focal point of the main reflecting mirror 20 coincide with each other.

The auxiliary reflecting mirror 30 is a reflecting element disposed in front of the light-emitting portion 11 and is fabricated by using, for example, quartz or Neoceram, which is a material with a low thermal expansion, or transparent alumina, sapphire, quartz, fluorite, or YAG which are the materials with a high thermal conductivity. The auxiliary reflecting mirror 30 includes a concave portion 31 having a reflecting surface 32 and enclosing almost half of the front side of the light-emitting portion 11 and a mounting support portion 35 extending outwardly from the central portion of the concave portion 31 and provided to fix to the light-emitting tube 10. Because the outer surface 33 of the concave portion 31 is molded to the prescribed surface shape with a better accuracy than the inner surface 34 due to the manufacturing process thereof, this being described in detail below, a reflecting surface 32 is formed on the outer surface 33. The auxiliary reflecting mirror 30 of such a configuration is inserted into the mounting support portion 35 so that the axis of the sealing portion 13 of the light-emitting tube 10 coincides with the axis of the auxiliary reflecting mirror 30. The focal point of the reflecting surface 32 is made to coincide with the arc image generated between the pair of electrodes 12. An inorganic adhesive 40, such as a cement, is injected into a gap between the inner periphery of the mounting support portion 35. The outer periphery of the sealing portion, and the auxiliary reflecting mirror is fixed to the light-emitting tube 10.

The luminous flux emitted from the illumination device 100 will be explained in detail herein with reference to FIG. 1(*b*). Of the luminous flux emitted from the arc image generated between the pair of electrodes 12 of the light-emitting portion 11, a luminous flux B1 that was directed straight to the main reflecting mirror 20 is reflected by the reflecting surface of the main reflecting mirror 20 and outgoes toward the position of a second focal point F2.

Further, a luminous flux B2 emitted from the arc image generated between the pair of electrodes 12 of the light-emitting portion 11 in the direction opposite the main reflecting mirror 20 is reflected by the reflecting surface 32 of the auxiliary reflecting mirror 30 toward the main reflecting mirror 20, then reflected by the reflecting surface of the main reflecting mirror 20, and outgoes from the main reflecting mirror 20 so as to be converged toward the position of the second focal point F2.

In a related art illumination device that was not equipped with the auxiliary reflecting mirror 30, the luminous flux emitted from the light-emitting portion 11 had to be converged in the position of the second focal point F2 only with the main reflecting mirror and the aperture diameter of the reflecting surface of the main reflecting mirror had to be increased.

However, providing the auxiliary reflecting mirror 30 makes it possible to reflect the luminous flux that is emitted from the light-emitting portion 11 in the direction (forward) opposite to the main reflecting mirror 20 with the auxiliary reflecting mirror 30 so that it falls on the reflecting surface of the main reflecting mirror 20. Therefore, almost the entire luminous flux emitted from the light-emitting portion 11 can be converged to a fixed point and emitted even if the aperture diameter of the reflecting surface of the main reflecting mirror 20 is small, and the size of the main reflecting mirror 20 in the optical axis direction and the aperture diameter thereof can be decreased. Thus, the illumination device 100 can be miniaturized and the inner layout of an electronic device, for example, a projector incorporating the illumination device 100 is facilitated.

Further, providing the auxiliary reflecting mirror 30 decreases the light gathering spot diameter in the second focal point F2. Therefore, even if the distance between the first focal point F1 and second focal point F2 of the main reflecting mirror 20 is decreased, almost the entire light emitted from the light-emitting portion 11 can be gathered by the main reflecting mirror 20 and auxiliary reflecting mirror 30 in the second focal point and used, and the light utilization efficiency can be greatly increased.

As described hereinabove, because the auxiliary reflecting mirror 30 is used, the luminous flux emitted from the light-emitting portion 11 in the direction (forward) opposite to the main reflecting mirror 20 is converged in the position of the second focal point F2 of the main reflecting mirror 20 similarly to the luminous flux directly falling from the light-emitting portion 11 on the reflecting surface of the main reflecting mirror 20, thereby increasing the light utilization efficiency of the illumination device 100. Therefore, the auxiliary reflecting mirror 30 having the reflecting surface 32 with a better molding accuracy makes it possible to construct the illumination device 100 in which the effect of installing the auxiliary reflecting mirror 30 can be demonstrated to even greater degree.

A method for the manufacture of the auxiliary reflecting mirror 30 will be described below.

Figure 2:
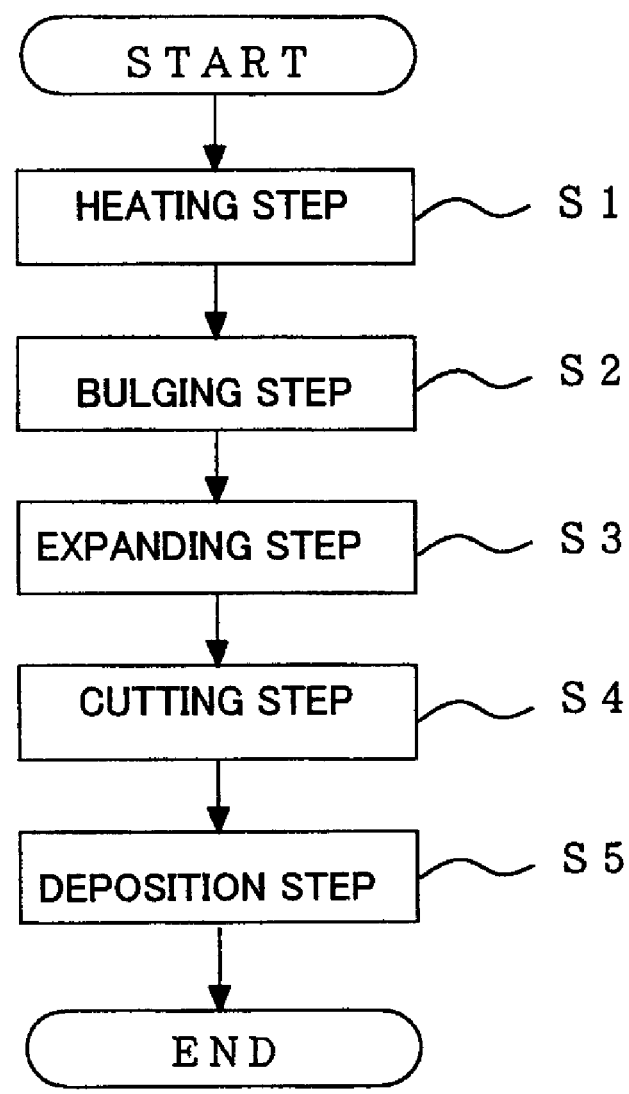
FIG. 2 is a process flow diagram illustrating the method for the manufacture of an auxiliary reflecting mirror.
Figure 3:
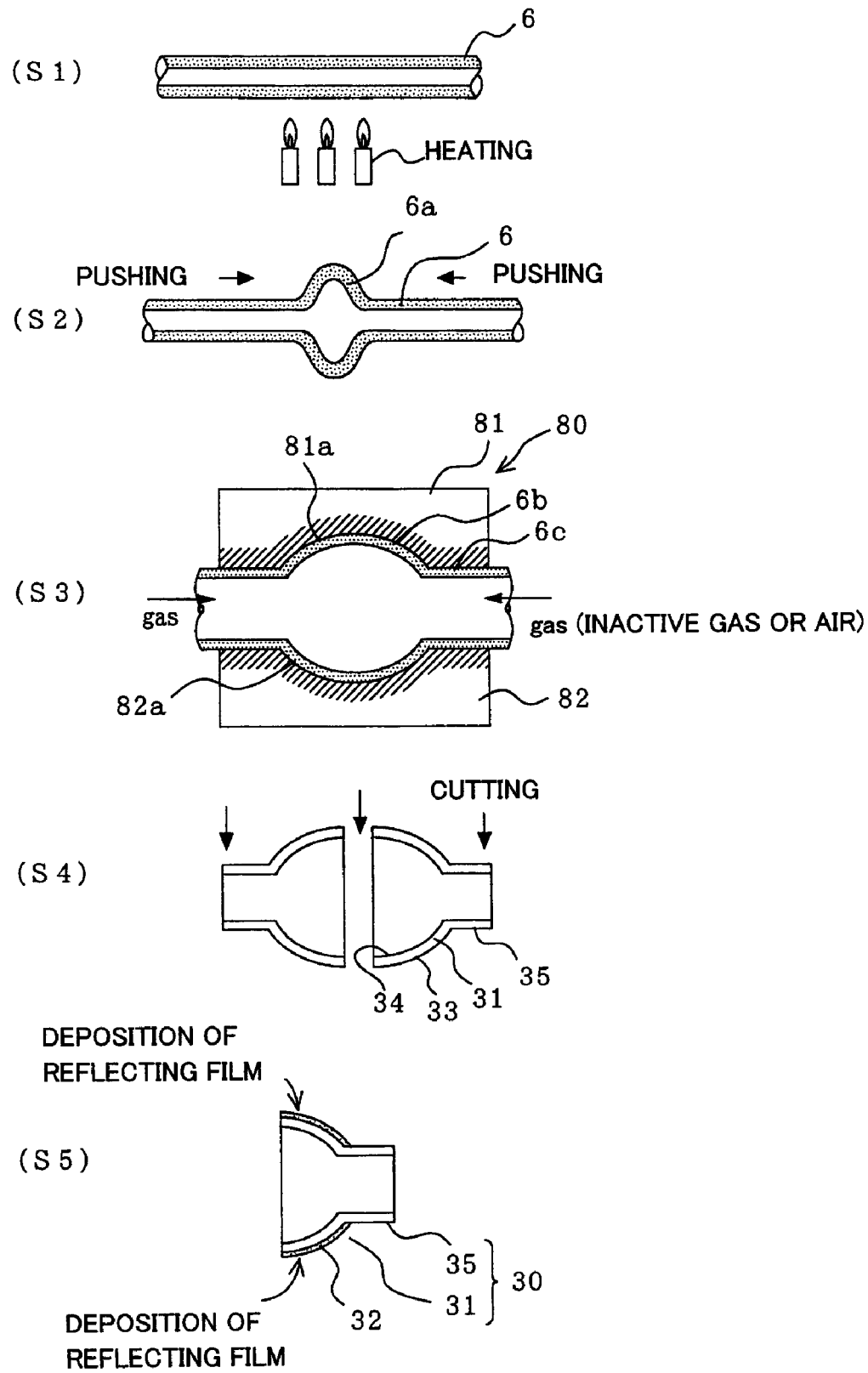
FIG. 3 is a schematic illustrating the process for the manufacture of an auxiliary reflecting mirror.

FIG. 2 and FIG. 3 show a process flow diagram and process model schematic explaining the method for the manufacture of the auxiliary reflecting mirror of one exemplary embodiment of the present invention, and the explanation will be conducted following those diagrams.

First, the central portion of, for example, quartz glass tube 6, which is a starting material, is heated to the prescribed high temperature and made to be easily deformable (S1 in FIG. 2 and FIG. 3, referred to hereinbelow as a heating step).

Then, the two end portions of the quartz glass tube 6 are pushed and compressed in the central direction to cause bulging in the central portion 6a (S2 in FIG. 2 and FIG. 3, referred to hereinbelow as a bulging step). In other words, the central portion 6a is compressed by pushing the two end portions of the quartz glass tube 6 so that the wall thickness of the central portion 6a thickens.

Then the bulged quartz glass tube 6 (the central portion 6a having the thickened wall thickness) is accommodated in a molding mold 80 and in this state blow molding is conducted by pumping a gas (inert gas or air) from the two end portions of the quartz glass tube 6 and the bulged central portion 6a (the central portion 6a having the thickened wall thickness) is expanded and an expanded portion 6b is formed (S3 in FIG. 2 and FIG. 3, referred to hereinbelow as an expansion step). As a result, an integrated body is formed which is composed of the hollow expanded portion 6b and cylindrical portions 6c extending outwardly from both ends thereof. Here, the upper mold 81 and lower mold 82 of the molding mold 80 have the inner surfaces 81a, 82a formed to a shape which is ideal as a shape of the reflecting surface 32, which is to be formed in the auxiliary reflecting mirror 30. Because the central portion 6a is expanded in a state of accommodation inside the molding mold 80, the ideal reflecting surface shape is transferred onto the outer surface 33 of the expanded portion 6b. Because the gas is blown onto the inner surface 34 of the expanded portion 6b in the expansion step, this inner surface is difficult to form to the desired reflecting surface shape.

Then, the quartz glass tube 6 is cut in two in the vicinity of the center of the expanded portion 6b thereof and both end portions of the cylindrical portions 6c extending outwardly from the two ends of the expanded portion 6b are cut off (S4 in FIG. 2 and FIG. 3, referred to hereinbelow as a cutting step). As a result, an auxiliary reflecting mirror body is formed which is composed of a concave portion 31 having an almost semispherical concave surface and a mounting support portion 35 extending outwardly from the central portion of the concave portion 31.

Then, a reflecting surface 32 is formed by evaporating a reflecting film by sputtering or the like on the outer surface 33 of the concave portion 31, which had, as described hereinabove, a high accuracy as the surface to form the reflecting surface (S5 in FIG. 2 and FIG. 3, referred to hereinbelow as a evaporation step). As a result, the reflecting surface 32 becomes a reflecting surface capable of reflecting with good efficiency the light from the light-emitting tube 10 toward the main reflecting mirror 20.

Thus, with the present exemplary embodiment, the reflecting surface 32 was formed on the outer surface 33 side of the concave portion 31 onto which the ideal reflecting surface shape provided on the molding mold 80 was transferred. Therefore, the reflecting surface 32 can be formed with good accuracy and it is possible to obtain the auxiliary reflecting mirror 30 with a high light utilization efficiency, which is capable of reflecting with good efficiency the light from the light-emitting tube 10 toward the main reflecting mirror 20. As a consequence, the illumination device 100 with a high light utilization efficiency can be obtained.

Furthermore, because the auxiliary reflecting mirror 30 has the mounting support portion 35, mounting on the light-emitting tube 10 is facilitated as compared with the configuration including only the concave portion 31, without the mounting support portion 35. Further, the mounting support portion 35 is effective from the standpoint of mounting ability, but the present invention is not necessarily limited to the configuration including the mounting support portion 35.

The illumination device 100 in accordance with an exemplary aspect of the present invention is not limited to the above-described exemplary embodiment and can be implemented in a variety of modes, without departing from the essence thereof. For example, the following modifications are also possible.

In the present exemplary embodiment, an example was described in which the expanded portion 6b was cut in the central portion and then the reflecting surface 32 was formed by vapor depositing the reflecting film on the outer surface of the concave portion 31. However, it is also possible to conduct vapor deposition of the reflecting film on the outer surface of the expanded portion 6b prior to cutting and then conduct cutting in the central portion thereof.

Furthermore, in the present exemplary embodiment, a method for the manufacture of the auxiliary reflecting mirror 30 was explained. But the main reflecting mirror 20 also may be manufactured by a similar manufacturing method.

Further, it was mentioned hereinabove, that because the gas is blown onto the inner surface 34 of the expanded portion 6b in the expansion step, this inner surface is difficult to form to the desired reflecting surface shape. Here, optical paths of reflected light will be compared to the case where the reflecting surface 32 was formed on the inner surface 34 and the case of the present example where the reflecting surface was formed on the outer surface 33. The effect attained by forming the reflecting surface on the outer surface 33 will be verified. In the case of reflection from the outer surface 33, the results are affected by the refractive action of the light-emitting tube 10. For this reason, the comparison of optical paths will be conducted by taking this refractive action into account.

Figure 4:
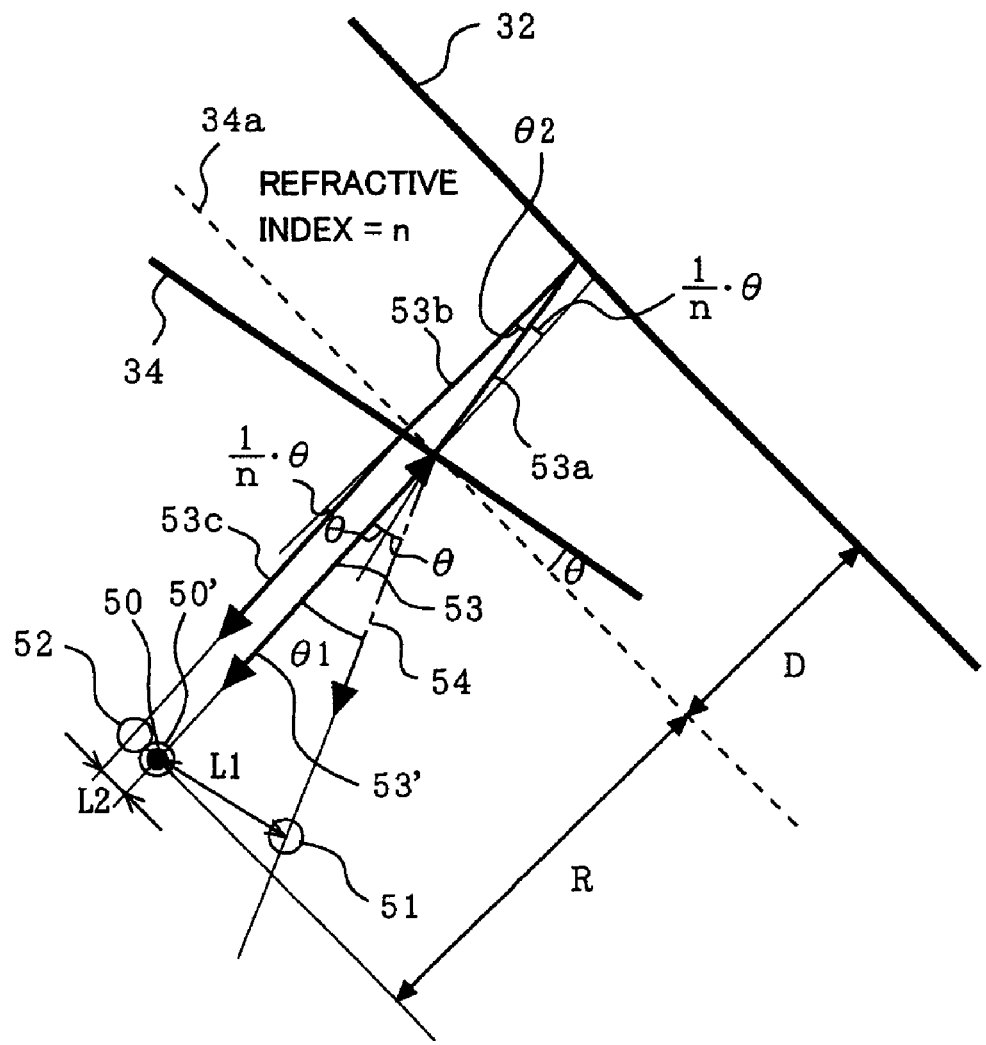
FIG. 4 is an optical path comparison schematic for the inner surface reflection and outer surface reflection.

FIG. 4 is a schematic illustrating the comparison of the optical paths of the reflected light in the case where the reflecting film was provided on the inner surface of the auxiliary reflecting mirror and the case where it was provided on the outer surface.

Referring to FIG. 4, the reference symbol 34a stands for an ideal inner surface of the auxiliary reflecting mirror 30, and the actual inner surface 34 is assumed to be inclined at an angle θ with respect to this ideal inner surface 34a. Furthermore, the reference symbol 50 stands for a light source under an assumption that the center of the light-emitting portion 11 is a point light source, 50' stands for a reflected light source in the case where the reflection was on the ideal inner surface 34a, 51 stands for a reflected light source in the case where the reflection was on the actual inner surface 34, and 52 stands for a reflected light source in the case where the reflection was on the outer surface 33. Furthermore, R is the distance from the reflected light source 50' to the ideal inner surface 34a, and D is the tubular thickness of the auxiliary reflecting mirror 30. Further, n denotes the refractive index of the auxiliary reflecting mirror 30.

When the light 53 emitted from the light source 50 is reflected by the ideal inner surface 34a, the reflected light 53' becomes the light that passes through the light source 50. Thus, because the reflected light source 50' created by the reflected light 53' that was reflected by the ideal inner surface 34a coincides with the light source 50, it will pass the same optical path as the light directly emitted from the light source 50 toward the main reflecting mirror 30. By contrast, in the case of reflection on the inner surface 34 inclined with respect to the inner surface 34a, because the inner surface 34 is inclined at an angle θ, the reflection angle θ1 becomes 2θ and the reflected light 54 is obtained. The displacement amount L1 of the reflected light source 51 created by this reflected light 54 from the reflected light source 50' can be represented by the following formula (1).

$$\text{Displacement amount } L1 = 2(R \cdot \tan(\theta 1/2)) \tag{1}$$

Furthermore, in the case of reflection on the outer surface 33, the light beam angle of the light 53 emitted from the light source 50 changes by $1/n \cdot \theta$ under the effect of the inclination of the inner surface 34 at the angle θ and the refractive index n of the light-emitting tube 10, and the light becomes the light beam 53a. At the time of reflection at the outer surface 33, the angle shifts by θ2 ($=2 \cdot 1/n \cdot \theta$) and the light becomes the reflected light 53b. Further, when the reflected light 53b passes through the inner surface 34, it is again refracted by the angle $1/n \cdot \theta$ and eventually becomes a light beam 53c parallel to the light beam 53. The displacement amount of the reflected light source 52 created by this light beam 53c from the reflected light source 50' can be represented by the following formula (2).

$$\text{Displacement amount } L2 = 2(D \cdot \tan(\theta 2/2)) \tag{2}$$

Here, it is assumed that the refractive index is 1.4602, the tube thickness D is 2 mm, and the distance R between the reflected light source 50' and ideal inner surface 34a is 10 mm. The reflection angles θ1, θ2 of the reflected light on the reflecting surfaces and the displacement amounts L1, L2 from the reflected light source 50' to the reflected light sources 51, 52, respectively, are calculated by using the above formulas (1) and (2) and changing the inclination angle θ of the actual inner surface 34 with respect to the ideal inner surface 34a. The graphs comparing the case where the reflection was on the inner surface 34 and the case where the reflection was on the outer surface 33 are shown in FIG. 5. In FIG. 5, the inclination angle θ [degree] of the actual inner surface 34 with respect to the ideal inner surface 34a is plotted against the abscissa, the reflection angle θ1 or θ2 [degree] of the reflected light at the inner surface 34 or outer surface 33 is plotted on the left ordinate. The displacement amount L1 or L2 [mm] from the reflected light source 50' to the reflected light source 51 or 52 is plotted against the right ordinate.

The symbol 61 in FIG. 5 stands for the reflection angle θ1 of the reflected light in the case of reflection on the inner surface 34, and 62 stands for the reflection angle θ2 of the reflected light in the case of reflection on the outer surface 33. The symbol 71 stands for the displacement amount L1 from the reflected light source 50' to the reflected light source 51 in the case of reflection on the inner surface 34, and the symbol 72 stands for the displacement amount L2 from the reflected light source 50' to the reflected light source 52 in the case of reflection on the outer surface 33. Here, θ1, θ2, L1, L2 correspond to θ1, θ2, L1, L2 shown in FIG. 4.

It is clear from FIG. 5, that at any inclination angle θ of the actual inner surface 34 with respect to the ideal inner surface 34a, of the reflection on the inner surface 34 and the reflection on the outer surface 33, both the reflection angle of the reflected light and the displacement amount from the reflected light source 50' to the reflected light source are smaller in the case of reflection on the outer surface 33. It follows herefrom that when the inner surface 34 is inclined with respect to the ideal inner surface 34a, a higher light utilization efficiency can be obtained with reflection on the outer surface 33.

Figure 6:
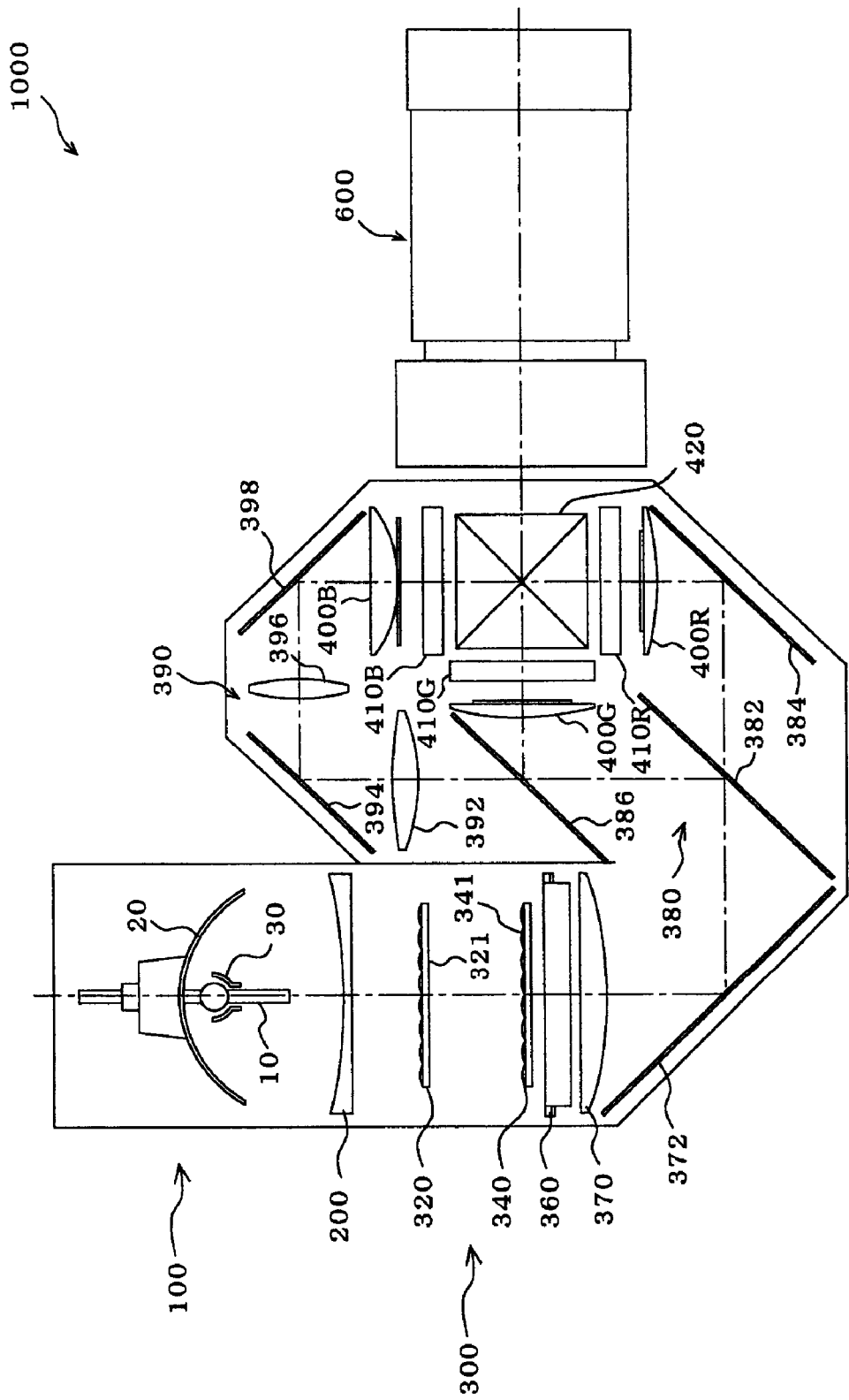
FIG. 6 is a schematic of the projector equipped with the illumination device of the aforementioned embodiment.

FIG. 6 is a schematic of a projector equipped with the above-described illumination device.

This projector 1000 includes an illumination optical system 300, a color light separation optical system 380, a relay optical system 390, liquid-crystal panels 410R, 410G, 410B, a cross dichroic prism 420, and a projection lens 600 which is a projection optical system.

The operation of the projector 1000 of the above-described configuration will be described below.

The illumination optical system 300 is an integrator illumination optical system to almost uniformly illuminate the image formation regions of the liquid-crystal panels 410R, 410G, 410B and includes the illumination device 100 of the above-described exemplary embodiment, a first lens array 320, a second lens array 340, a polarization conversion element array 360, and a superposition lens 370.

First, the emitted light from behind the center of the light-emitting portion 11 of the light-emitting tube 10 is reflected by the main reflecting mirror 20 frontward of the illumination device 100. Then, the emitted light from the zone in front of the center of the light-emitting portion 11 is reflected by the auxiliary reflecting mirror 30 and returned to the main reflecting mirror 20. This light is then reflected by the main reflecting mirror 20 frontward of the illumination device 100. Here, because the reflecting surface 32 of the auxiliary reflecting mirror 30 is formed with good accuracy, as was described hereinabove, the incident light can be reflected with good efficiency toward the main reflecting mirror 20. Further, the light outgoing from the illumination device 100 enters the concave lens 200 and the propagation direction of the light is adjusted to be almost parallel to the optical axis of the illumination optical system 300.

The parallelized light falls on each small lens 321 of the first lens array 320 and is split into a plurality of partial luminous fluxes whose number corresponds to the number of the small lenses 321. Furthermore, each partial luminous flux outgoing from the first lens array 320 falls on the second lens array 340 having small lenses 341 corresponding to each respective small lens 321.

Further, the outgoing light from the second lens array 340 falls on the polarization conversion element array 360 to adjust into linearly polarized lights of the type with the same direction of polarization. A plurality of partial luminous fluxes with the polarization direction adjusted with the polarization conversion element array 360 enter the superposition lens 370, where each partial luminous flux falling on the liquid-crystal panels 410R, 410G, 410B is adjusted so as to be superimposed on the corresponding panel surface.

The light outgoing from the superposition lens 370 is reflected with the reflecting mirror 372 and then falls on the color light separation optical system 380. The color light separation optical system 380 is an optical system to separate the light emitted from the illumination optical system 300 into color lights of three colors: red, green, and blue and includes dichroic mirrors 382, 386 and a reflecting mirror 384.

The first dichroic mirror 382 transmits the red color light component of the light outgoing from the superposition lens 370 and reflects the blue color light component and green color light component. Further, the red color light component passes through the first dichroic mirror 382, is reflected by the reflecting mirror 384, and reaches the liquid-crystal panel 410R for the red color light via a field lens 400R. Further, of the blue color light component and green color light component reflected by the first dichroic mirror 382, the green color light component is reflected by the second dichroic mirror 386 and reaches the liquid-crystal panel 410G for the green color light via a field lens 400G.

The blue color light component passes through the second dichroic mirror 386 and falls on the relay optical system 390. The relay optical system 390 is an optical system having a function of guiding the blue color light that passed through the dichroic mirror 386 of the color light separation optical system 380 to the liquid-crystal panel 410B and includes an incoming-side lens 392, a relay lens 396, and reflecting mirrors 394, 398.

Thus, the blue color light component passes through the incoming-side lens 392, reflecting mirror 394, relay lens 396, and reflecting mirror 398 and then reaches the liquid-crystal panel 41 OB for the blue color light via a field lens 400B. Further, The relay optical system 390 is used for the blue color light in order to reduce or prevent the decrease in the light utilization efficiency caused by light scattering or the like, resulting from the fact that the length of the optical path of the blue color light is larger than the length of the optical path of other color lights. Thus, the relay optical system serves to transmit the partial luminous flux that fell on the incoming-side lens 392 directly to the field lens 400B. Further, the relay optical system 390 has a configuration that transmits the blue color light of the three color lights. But it may be also configured to transmit other color lights, for example, the red color light.

Then, the three liquid-crystal panels 410R, 410G, 410B modulate each color light falling thereon according to the given image information and form the images of each color light. Further, polarizing plates are usually provided on the light incidence surface side and light outgoing surface side of each liquid-crystal panel 410R, 410G, 410B.

Then, the modulated light of each color light outgoing from each liquid-crystal panel 410R, 410G, 410B falls on the cross dichroic prism 420 serving as a color light synthesizing optical system to synthesize those modulated lights and forming a color image. In the cross dichroic prism 420, a dielectric multilayer film to reflect the red color light and a dielectric multilayer film to reflect the blue color light are formed in an almost X-like fashion on the boundary surfaces of four right prisms and the three color lights are synthesized by those dielectric multilayer films.

Further, the color image outgoing from the cross dichroic prism 420 is enlarged and projected on a screen with the projection lens 600.

With the above-described projector 1000, because illumination device 100 described hereinabove is provided, a high light utilization efficiency can be obtained and an increased luminosity of the projector 1000 can be attained.

Further, the projector 1000 in accordance with an exemplary aspect of the present invention is not limited to the above-described exemplary embodiment and can be implemented in a variety of modes, without departing from the essence thereof. For example, the following modifications are also possible.

In the above-described exemplary embodiment, there were used two lens arrays 320, 340 to split the light from the illumination device 100 into a plurality of partial light fluxes. But the present invention can be also applied to the projector which does not use such a lens array.

In the above-described exemplary embodiment, a projector using transmission-type liquid-crystal panels was described as an example. But the present invention is not limited thereto and can be also applied to a projector using reflection-type liquid-crystal panels. In the case of a projector using reflection-type liquid-crystal panels, a configuration including only liquid-crystal panels is possible and a pair of polarizing plates are not required. Furthermore, in a projector using reflection-type liquid-crystal panels, a cross dichroic prism is sometimes used as a color light separation device to separate the illumination light into lights of three colors: red, green, and blue, and also as a color light synthesizing device to synthesize again the modulated lights of three colors and emitting them in the same direction. Furthermore, sometimes a dichroic prism combining a plurality of triangular or quadrangular rod-like dichroic prisms is used instead of the cross dichroic prism. When the present invention is applied to the projector using reflection-type liquid-crystal panels, it is possible to obtain the effect almost identical to that obtained with the projector using transmission-type liquid-crystal panels.

Further, the projector using three liquid-crystal panels as modulation devices was explained as an example. However, the present invention can be also applied to a projector with a structure using one, two, four or more liquid-crystal panels.

Furthermore, the light modulation device to modulate the incident light and generate an image is not limited to a liquid-crystal panel. For example, it may be also a device using a micromirror. Furthermore, the lamp device in accordance with an exemplary aspect of the present invention can be also employed in both the front projection-type projectors, in which image projection is conducted from the direction in which the projection surface is observed, and the rear projection-type projectors, in which image projection is conducted from the side opposite to the direction in which the projection surface is observed.

Industrial Field of Applications

An illumination device equipped with an exemplary aspect of the auxiliary reflecting mirror manufactured by the manufacturing method in accordance with the present invention in the above-described manner can be widely employed as a light source for a projector or other various optical devices.

What is claimed is:

1. An illumination device, comprising:
a light-emitting tube having a pair of electrodes;
a main reflecting mirror that reflects light from the light-emitting tube toward an illumination region;
an auxiliary reflecting mirror that reflects the light from the light-emitting tube toward the light-emitting tube, the auxiliary reflecting mirror having an inner surface and an outer surface, the inner surface being inclined at an angle with respect to an ideal inner surface, the ideal inner surface being defined as a surface that reflects the light from a center of an arc image generated between the pair of electrodes so that the light reflected by the ideal inner surface passes through the center of the arc image, the auxiliary reflecting mirror having a mounting support portion, the auxiliary reflecting mirror being fixed to the light-emitting tube in a condition that a focal point of a reflecting film is made to coincide with the arc image; and
the reflecting film provided on the outer surface, the reflecting film on the outer surface reflecting light from the center so that the light reflected by the reflecting film passes toward the center within 3 mm.

2. A projector, comprising:
the illumination device according to claim 1;
a light modulation device that modulates the light from the illumination device according to an image information; and
a projection optical system that projects the modulated light by the light modulation device.

3. A projector, according to claim 2
in the illumination device, the inner surface being inclined at an angle θ with respect to an ideal inner surface, the ideal inner surface reflects the light from an arc image generated between the pair of electrodes so that the reflected light passes though the arc image, the reflecting film on the outer surface reflects light from an arc image generated between the pair of electrodes so that the reflected light passes though the arc image.

* * * * *